(12) United States Patent
Akram

(10) Patent No.: US 7,339,396 B1
(45) Date of Patent: Mar. 4, 2008

(54) METHOD AND APPARATUS FOR AMELIORATING THE EFFECTS OF NOISE GENERATED BY A BUS INTERFACE

(75) Inventor: Waqas Akram, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 64 days.

(21) Appl. No.: 11/387,411

(22) Filed: Mar. 23, 2006

(51) Int. Cl.
*H03K 17/16* (2006.01)
(52) U.S. Cl. .......................................... 326/22; 326/26
(58) Field of Classification Search .................. 326/21, 326/26, 30, 31, 33; 327/379
See application file for complete search history.

(56) References Cited

U.S. PATENT DOCUMENTS

| | | | |
|---|---|---|---|
| 5,652,585 | A | 7/1997 | Leung et al. |
| 5,719,573 | A | 2/1998 | Leung et al. |
| 5,801,652 | A | 9/1998 | Gong |
| 6,114,898 | A * | 9/2000 | Okayasu ..................... 327/437 |
| 6,449,569 | B1 | 9/2002 | Melanson |
| 6,768,334 | B1 * | 7/2004 | Yamauchi et al. ............. 326/30 |
| 6,980,021 | B1 * | 12/2005 | Srivastava et al. ............. 326/30 |
| 7,224,180 | B2 * | 5/2007 | Hargrove et al. ............. 326/30 |

* cited by examiner

*Primary Examiner*—Rexford Barnie
*Assistant Examiner*—Thienvu V Tran
(74) *Attorney, Agent, or Firm*—Andrew M. Harris; Mitch Harris, Atty at Law, LLC

(57) ABSTRACT

A method and apparatus for ameliorating the effects of noise generated by a bus interface provides improved performance of integrated circuits having other circuits sensitive to the transient noise introduced by bus signal switching. Additional signals are generated that equalize the frequency of occurrences of the transients, so that an effectively constant and non-data-dependent frequency is generated over the totality of the signals. The loading characteristics of the additional signals and interface signals are matched, and the interface and additional signals may be generated as complementary pairs, so that the net DC energy of the transients is also substantially made equal to zero. Any or all of the interface and additional signals may be used as data signals, or all but one of the signals may be supplied to an internal or external dummy load. A loading circuit may be calibrated by a circuit that senses the interface loading.

22 Claims, 5 Drawing Sheets

METHOD AND APPARATUS FOR AMELIORATING THE EFFECTS OF NOISE GENERATED BY A BUS INTERFACE

BACKGROUND OF THE INVENTION

1. Field of the Invention

The present invention relates generally to bus interfaces, and more specifically, to a method and system for ameliorating the effects of noise generated by interface bus drivers.

2. Background of the Invention

In low noise applications such as analog-to-digital (ADC) and digital-to-analog (DAC) converters, as well as in other mixed-signal device, the noise generated by exporting data over a bus can contribute significantly to the converter noise. In particular, in applications where a bus interface has an inherently low impedance for conducting data over large distances or where the bus impedance is low due to loading, significant switching transients are generated in the power supply distribution paths and via parasitic coupling mechanisms that affect the performance of the analog conversion circuits and other elements such as analog amplifiers in the input or output paths of the converters.

One mechanism that reduces the effects of such transient-generated noise is the use of differential interface pairs with matched impedance characteristics. Since transients are generated in both directions at each transition, the energy contributed by the transitions can be made to have a substantially zero DC value. However, the AC effects generated by the interface transitions have particular harmonic components that still effect the operation of converters and other circuits.

Therefore, it would be desirable to provide a method and apparatus that ameliorate the effects of transient noise generated by a bus interface on other circuits. It would further be desirable to provide such a method and apparatus that can be packaged in an integrated circuit containing converters or other sensitive circuits. It would also be desirable to provide such an integrated circuit requiring no additional terminals.

SUMMARY OF THE INVENTION

The above stated objectives of ameliorating the effects of transient generated noise generated by a bus interface on other circuits is provided in a method and apparatus. The method is a method of operation of the apparatus, which is a modified interface circuit.

The modified interface circuit provides at least one interface terminal for providing at least one interface bus signal to a bus having a predetermined loading characteristic (impedance). At least one additional signal is generated that has a transition for every period of the interface bus signal that does not have a transition. The additional signal is coupled to a signal node having a loading characteristic substantially equal to the loading characteristic at the interface terminal. The result is that transient noise is generated having a substantially constant frequency no matter what the specific data pattern on the interface is. The frequency can then be made equal to a multiple of the sampling rate of an associated converter, or other frequency that has no or little impact on the operation of other circuits.

The interface signal may be a differential signal provided to a matched impedance pair of bus terminals, producing a substantially zero-energy net energy at each transition and the additional signal may also be a differential pair of signal provided to external terminals for providing the additional signal pair to a pair of dummy loads matched to the bus terminals. For a single-ended interface, one of the differential interface signals may also be connected to a dummy load.

Alternatively, the additional signals and optionally one of the pair of interface signals may be provided to an internal loading circuit that may be calibrated by a measurement of the loading characteristic at the bus interface terminal(s) by a calibration circuit. Also alternatively, a single additional signal may be employed that generates two transitions in each period of the interface signal, so that the transients have both a net zero energy across the totality of the interface and additional signals, as well as a constant number of transitions.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses a method and apparatus that reduce the impact of noise that is generated by a bus interface on the operation of other circuits. The embodiments depicted herein are generally directed toward serial interfaces having a single or differential connection for transmitting data to a remote receiver. However, the techniques disclosed herein apply generally to any interface where internal interference occurs due to the switching transients generated in driving a bus interface. Therefore, where noise amelioration for a single serial interface bus signal is described, the techniques can be applied to multiple signals transmitted over a parallel bus comprising multiple single-ended or differential signals.

The present invention reduces the effects of transient generated noise by generating signals in addition to the bus interface signals and providing them to loads having loading characteristics (load impedance) substantially matching those of the loading of the bus signals. The additional signals, in combination with the single-ended or differential interface signal(s), are generated to enforce two conditions: 1) The frequency of transitions, or count of transitions in each period of the interface signal, among the totality of all of the interface and additional signals, is substantially constant; and 2) The net energy of the transitions among the totality of all of the signals is substantially equal to zero. The result of the above two requirements is that per-period power supply and interference produced due to energy coupled from the transitions on the interface is minimized by cancellation between the positive and negative transitions, and what interference remains is at a predetermined frequency that can be advantageously filtered or otherwise made less insignificant in a particular design. Finally, there is no data-dependent energy pattern due to the interface signals, since the additional signals will essentially "fill in" any holes generated in the transient (edge-generated) energy pattern, providing the above-described constant frequency/constant harmonic content characteristic, which can then be rendered innocuous. For example, in an analog signal converter application, the predetermined frequency (the period of the interface signal) can be set to a multiple of the sampling frequency of the converter so that the predetermined frequency will fall on a zero of the converter response.

Figure 1:
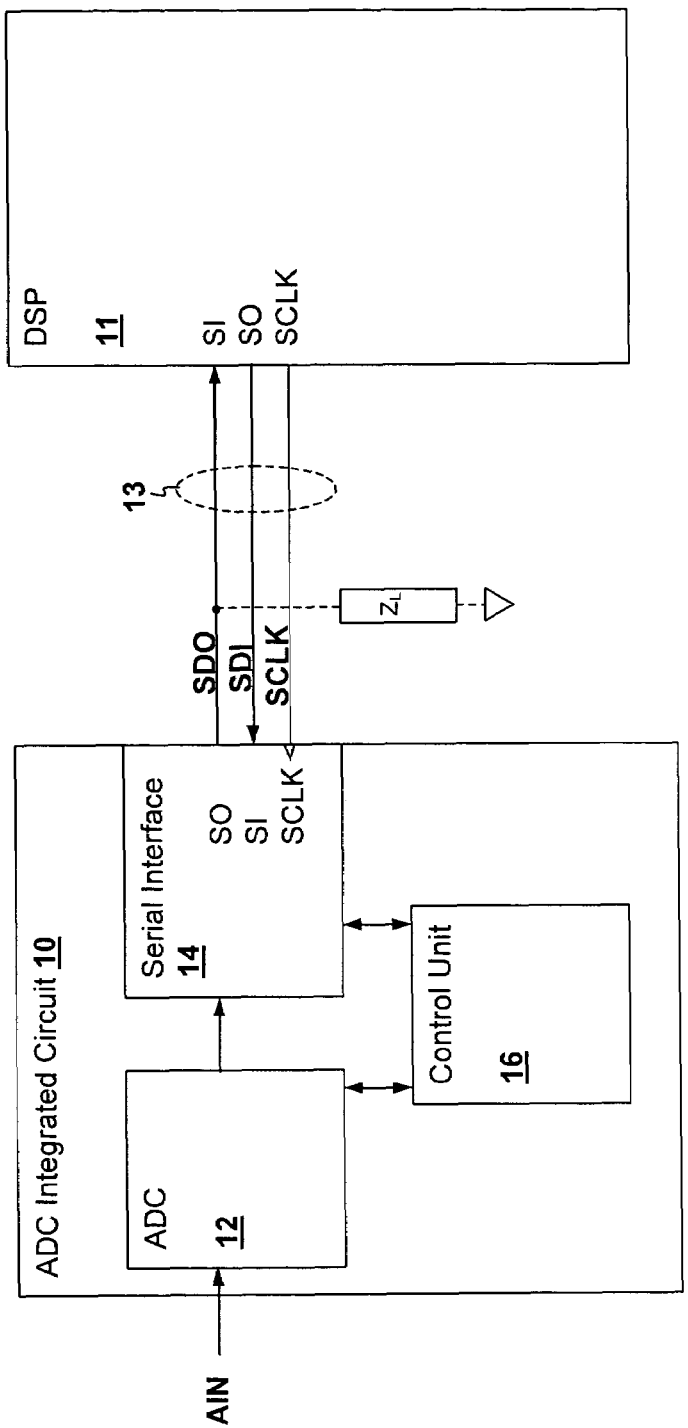
FIG. 1 is a block diagram depicting an analog-to-digital converter circuit 10 in accordance with an embodiment of the present invention connected to a digital signal processor 11.

Referring now to FIG. 1, a block diagram depicting an analog-to-digital converter (ADC) 10 in accordance with an embodiment of the present invention that is connected by an interface bus 13 to a digital signal processor (DSP) 11 is shown. Interface bus 13 includes a serial clock signal SCLK, a serial data output signal SDO provided by a serial output (SO) of ADC 10 and a serial data input signal SDI provided to a serial input (SI) of ADC 10. Serial interface 14 provides data corresponding to analog signal(s) AIN converted to a digital number via ADC 12 under control of a control unit 16 and includes features that ameliorate the effects of providing signals on the SDO output of serial interface 14 to DSP 11. Load impedance $Z_L$ represents the impedance loading the output SO of serial interface 14 that determines the current for a given output voltage that is sourced by a driver that provides the SO output of serial interface 14. Without the features of serial interface 14 provided by the present invention, the transients generated in the power supply distribution network within ADC 10 and noise coupled from serial interface 14 to internal circuits of ADC 12 would have their full impact on the circuits of ADC 12. However, the features that will be described below will ameliorate the effects of the switching transients generated within ADC 10 due to driving the SDO signal on interface bus 13. Serial clock signal SCLK is not a requirement of the present invention, as the techniques of the present invention can be applied in asynchronous serial interfaces, as well.

Figure 2:
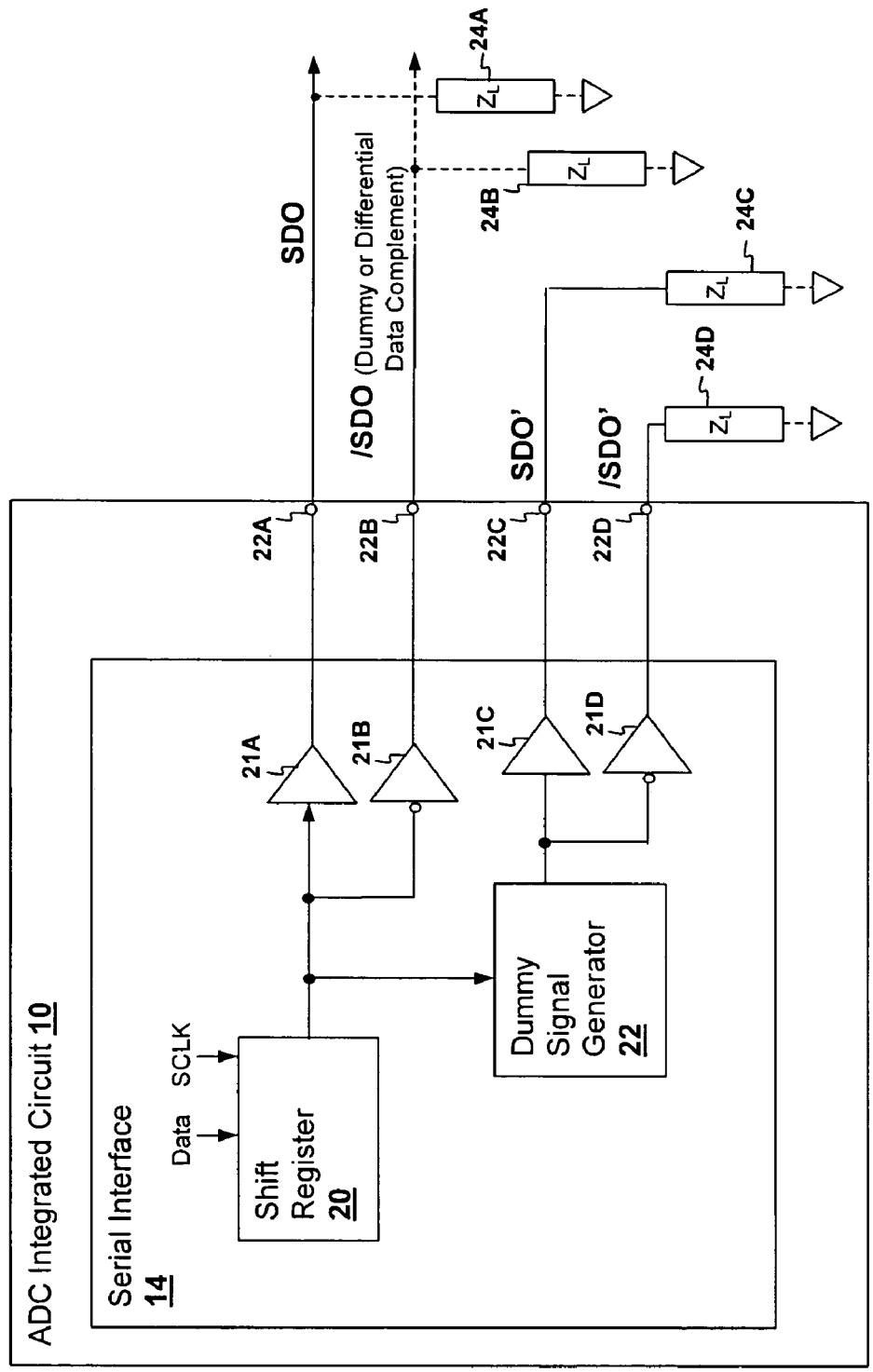
FIG. 2 is a schematic diagram depicting details of analog-to-digital converter 10 of FIG. 1 in accordance with an embodiment of the present invention.

Referring now to FIG. 2, details of serial interface 14 for ADC integrated circuit 10 are shown. A shift register 20 provides a stream of serial data in a manner as generally provided in serial interface circuits and the output of shift register 20 is provided to the inputs of a pair of line drivers 21A, 21B that generate complementary interface bus 13 signals SDO and /SDO. Interface signal SDO is provided at an interface bus terminal 22A having a loading characteristic $Z_L$ (load impedance) 24A and provides a data connection to a remote device, such as DSP 11 of FIG. 1. Depending on implementation, output /SDO may be delivered to an interface bus terminal 22B that supplies a complementary data signal to the remote device as part of a differential data signal pair, or may be supplied to a dummy load. In either implementation, bus terminal 22B is provided with a load impedance 24B substantially equal to that of impedance 24A. While load impedance 24A will generally have a resistive and capacitive component, in the present invention it may be sufficient to provide any dummy loads as resistors. Alternatively, parallel or series resistor-capacitor circuits may be included as dummy loads. Further, it is not necessary to use dummy loads at all, if it is desirable to connect each of the generated signals at the outputs of line drivers 21A-21D at input terminals of the remote device.

A dummy signal generator 22 generates an output signal that is provided to the other pair of line drivers 21C, 21D that are shown as connected to a pair of dummy loads 24C, 24D having an impedance substantially matching that of impedance 24A. The output of dummy signal generator 22 has a transition in every period that serial data output SDO signal does not make a transition, thus providing the constant frequency operation described above. While the illustrative embodiment shows either a single-ended or differential data signal and a pair of additional signals, any or all of the depicted signals can be used to convey the data, as a lack of a transition in the "dummy" signals can be used to indicate a change in the data and a reconstruction circuit may be employed in the remote device to extract the data from the additional signals. Further, if the "dummy" signals were provided to the remote interface, they could be used to add confidence to the data values at the remote interface, at the cost of additional interface bus 13 signal lines. However, if a single data signal (instead of a differential signal pair or other multiple signal combination) is provided to the remote interface, then three dummy loads must be provided, one for the complement data signal /SDO and the other two for the complementary dummy signals. One alternative embodiment provides for a single dummy signal that provides some noise amelioration for a single-ended or differential interface by including two transitions within a single data period in periods where the data signal(s) do not transition. Such a mechanism does not provide as ideally regular a frequency of the generated interference, but can provide one in which the harmonic content is again a multiple of a predetermined frequency as will be illustrated below as an optional embodiment.

Figure 3:
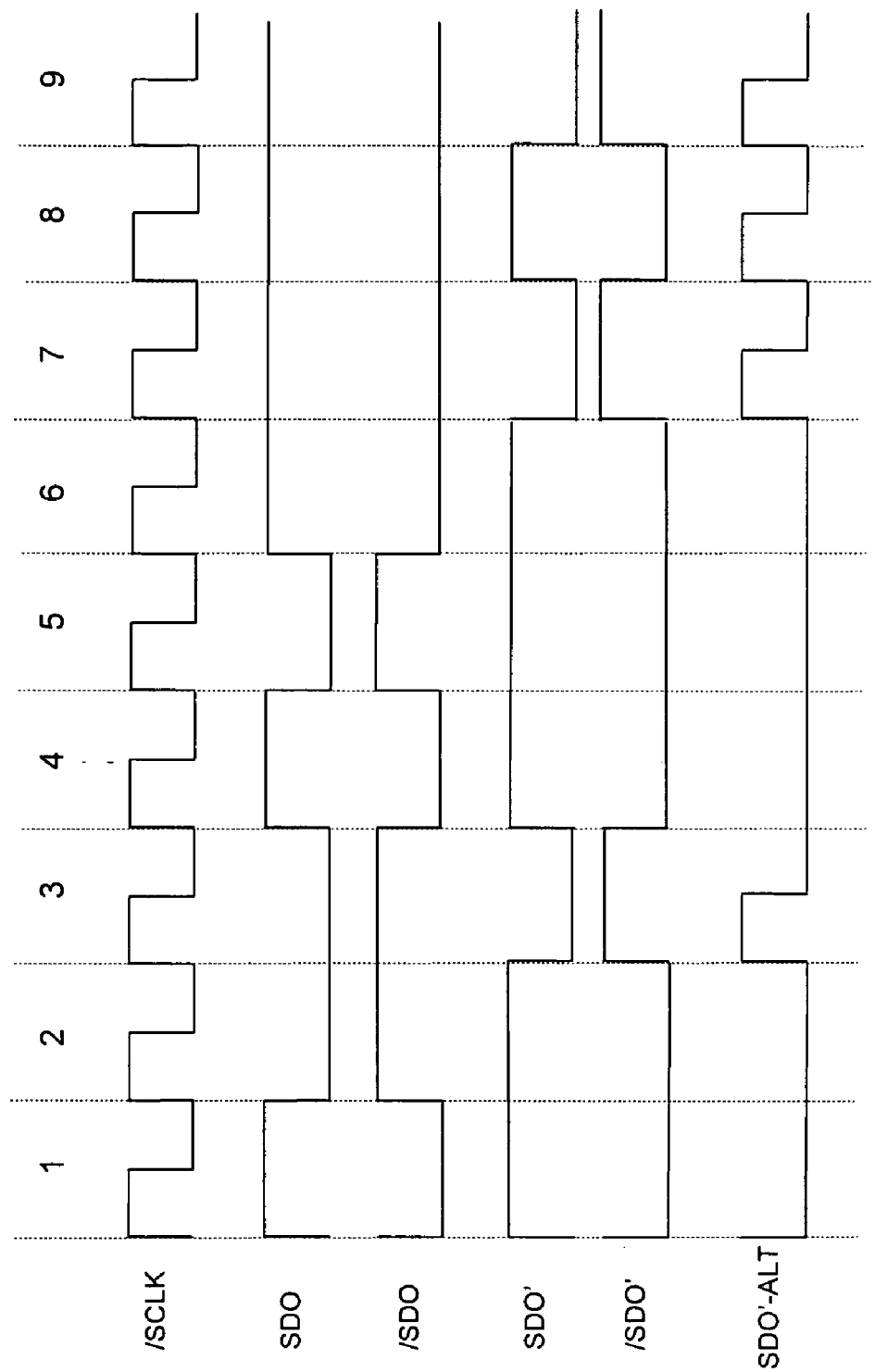
FIG. 3 is a timing diagram showing details of operation of an apparatus in accordance with an embodiment of the present invention.

Referring now to FIG. 3, a timing diagram depicting operation of the above-described circuits is shown. Serial interface signal SDO is provided in synchrony with a serial clock signal /SCLK and a complementary signal /SDO is also provided (to a differential destination or a dummy load). Additional signal SDO' and its complement /SDO' are generated and provide transitions in each period where SDO (and therefore /SDO) have no transition. As illustrated, SDO (and /SDO) transition at periods 1, 2, and 4-6. Therefore, additional signals SDO' and /SDO' are made to transition at periods 3 and each of periods 7-9. In some serial interface implementations, there are periods of static value of the interface signals that occur between data transmissions as may be illustrated by periods 7-9. In such an interface, the present invention may be implemented to generate transitions continually on the additional signal lines. Alternatively, the additional signal transitions may be ceased after a serial transmission has been completed, resulting in power savings in circuits where transmissions on the interface are infrequent. As can be observed, the data pattern in data pair SDO and /SDO, which would render a data-dependent transition energy pattern, which would either be coupled on the power supply/return paths or radiated, causing interference, is complemented in signals SDO' and /SDO', so that no data-dependent interference is generated by the totality of the signals.

An alternative embodiment of the invention as mentioned above that uses a single dummy signal to generate both a positive and a negative transition in a single period is illustrated in signal SDO'-ALT. In periods 3 and 7-9, signal SDO'-ALT is made to transition twice, providing a net zero energy impact and a frequency of transitions over the totality of the signals that is still constant in each period, although the harmonic content of the generated interference does not remain constant when transitions are generated in signal SDO'-ALT.

Figure 4:
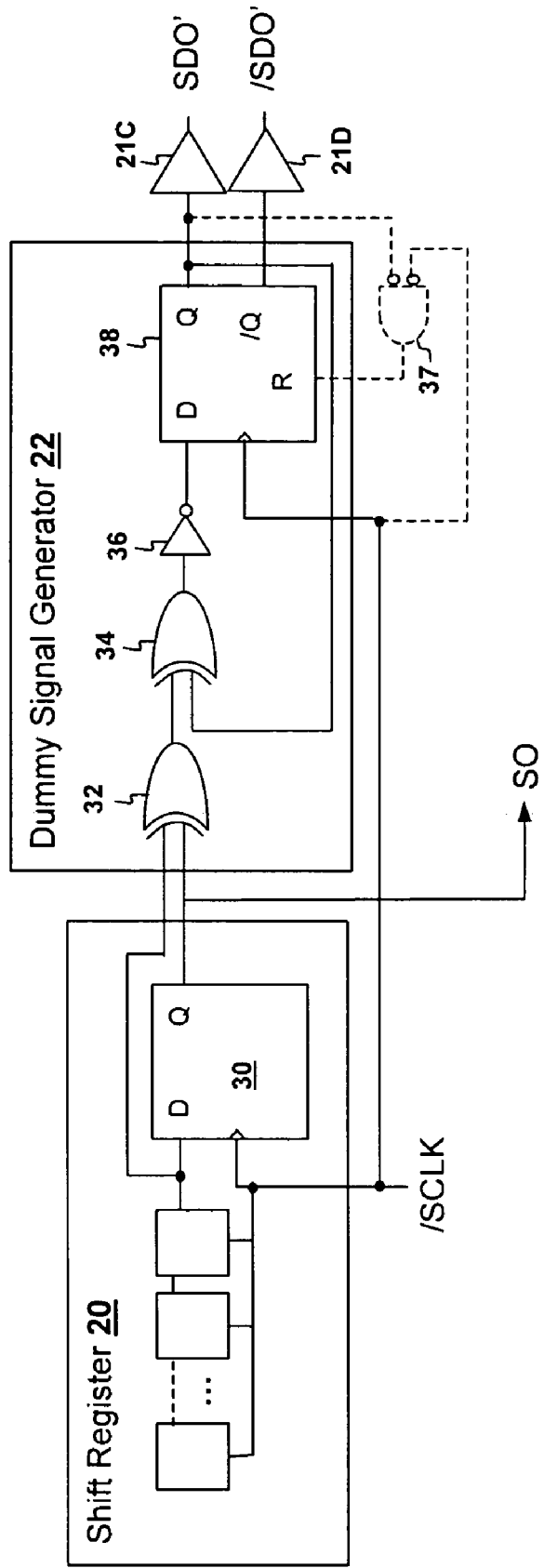
FIG. 4 is a schematic diagram depicting details of serial interface 14 of FIG. 1 in accordance with an embodiment of the present invention.

Referring now to FIG. 4, details of serial interface 14A, which is an embodiment of serial interface 14, are depicted. Dummy signal generator 22 is coupled to shift register 20 to receive the current serial output value from the output of the last stage 30 of shift register 20 as well as the next value of the SO signal present at the input to last stage 30. An exclusive-OR (XOR) gate 32 compares the present and next value, and if they differ, an input to another XOR gate 34 is asserted to invert a feedback path around flip-flop 38 that would otherwise cause flip-flop 38 via inverter 36 to toggle. (Flip-flop 38, inverter 36 and XOR gate 34 can be viewed as a toggle flip-flop with an inverted toggle input.) The action of the circuit thus causes the output of flip-flop 38 to toggle each time the next SO value does not differ from the previous one, satisfying the condition that the additional signals provided by dummy signal generator 22 will cause transitions on signal lines SDO' and /SDO' via drivers 21C and 21D in periods in which no transition occurs in serial output SO. Optional AND gate 37 illustrates the alternative multiple-transition embodiment illustrated above in signal SDO'-ALT, as AND gate 37 will cause flip-flop 38 to be reset during the second phase of /SCLK.

Figure 5:
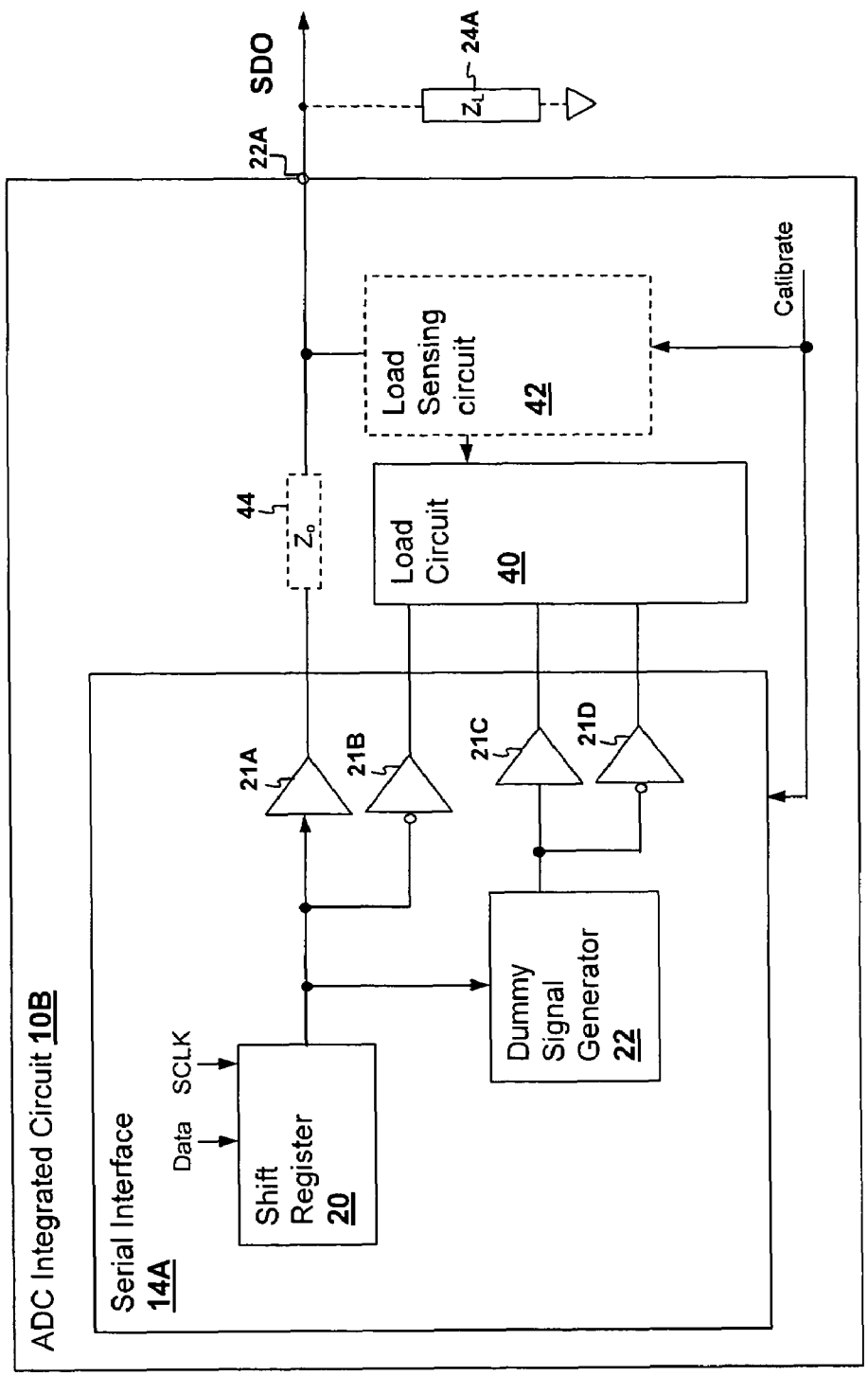
FIG. 5 is a block diagram depicting an analog-to-digital converter circuit 10B in accordance with another embodiment of the present invention.

Referring now to FIG. 5, details of an ADC integrated circuit 10B in accordance with another embodiment of the invention is depicted. Details of ADC integrated circuit 10B are identical to that of ADC integrated circuit 10A described above with respect to FIG. 2 except for differences described in detail below. Rather than including external terminals for bus connection or dummy loading of additional signals generated by dummy signal generator and the complement of serial data signal /SDO, ADC integrated circuit 10B provides an internal load circuit 40 that sinks/sources current to the outputs of drivers 21B-21D to match the load impedance $Z_L$ 24 present at serial data output terminal 22A. An optional load sensing circuit 42 that may be responsive to a calibration indication during calibration of the ADC circuits or during another interval can be used to adapt the impedance level of loading presented by load circuit 40 to the actual load present at output terminal 22A. Either a known output impedance of line driver 21A or an additional impedance $Z_o$ 44 (which may be optionally switched out after calibration) may be used to detect the value of load impedance 24A. Load circuit 40 may be provided by current source/sink transistor pairs or current mirrors having gate voltages set by a voltage retained by load sensing circuit 42 after calibration, as is well-known in the art. Capacitive loading can also be provided by load circuit 40 in response to an AC measurement by load sensing circuit 42 by controlling switched capacitor banks. An AC measurement can be made by observing the response to a change in the state of signal SDO in the time or frequency domain.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of operating an electronic interface driver, comprising:
    first generating at least one interface signal;
    providing said at least one interface signal to at least one output terminal of said driver having predetermined loading characteristics; and
    second generating at least one additional signal for delivery to a load substantially equal to that of said predetermined loading characteristics of said at least one output terminal, wherein said at least one additional signal is coded in dependence on said at least one interface signal such that among the totality of said at least one interface signal and said at least one additional signal, a quantity of transitions of said totality of signals is substantially constant for repeated periods, such that as a number of transitions of said at least one interface signal changes in said periods, a number of transitions of said at least one additional signal also changes to make said quantity of transitions of said totality of signals substantially constant, whereby data-dependent variation in the transient-associated energy of the totality of the signals is substantially removed.

2. The method of claim 1, wherein an equal number of positive and negative transitions are generated among said totality of signals in each period of said at least one interface signal, whereby an energy of transitions in said totality of signals is substantially equal to zero.

3. The method of claim 1, wherein said first generating generates a differential pair of signals and wherein said providing provides said differential pair of signals to a corresponding pair of output terminals for communicating a differential signal over an electronic interface.

4. The method of claim 1, wherein said first generating generates a differential pair of signals and wherein said providing provides one of said differential pair of signals to said output terminal for communicating a single-ended signal on said electronic interface, and wherein another signal of said differential pair of signals is applied to a load substantially matching said predetermined loading characteristic.

5. The method of claim 1, wherein said second generating generates a pair of additional signals each for delivery to a additional load matching said predetermined loading characteristic, and wherein said pair of additional signals includes a positive and a negative transition, each on a corresponding one of said pair of additional signals in each period of said interface signal in which no transition occurs in said interface signal.

6. The method of claim 1, further comprising providing said at least one additional signal to an additional output terminal having loading characteristics matching said predetermined loading characteristics.

7. The method of claim 1, further comprising providing said at least one additional signal to an internal loading circuit of said interface driver having loading characteristics matching said predetermined loading characteristics.

8. The method of claim 7, further comprising sensing said predetermined loading characteristics of said at least one output terminal via a sensing circuit within said interface driver.

9. The method of claim 8, further comprising tuning said internal loading circuit of said interface driver in conformity with a result of said sensing.

10. The method of claim 1, wherein said at least one interface signal comprises at least two interface signals, and wherein said second generating generates a single additional signal having a number of transitions in each period of said interface signal matching a number of possible transitions in said at least two interface signals in each period of said interface signal, less an actual number of transitions in said at least two interface signals in each period of said at least two interface signals.

11. An electronic interface driver circuit, comprising:
at least one output terminal bearing a corresponding at least one interface signal, said output terminal having predetermined loading characteristics;
at least one additional signal node having a load impedance substantially equal to that of said predetermined loading characteristics of said output terminal; and
a signal generating circuit having at least one input coupled to said corresponding at least one interface signal and having at least one output coupled to a corresponding one of said at least one additional signal node for generating at least one additional signal on said at least one additional signal node in dependence on said at least one interface signal such that among the totality of said at least one interface signal and said at least one additional signal, a quantity of transitions of said totality of signals is substantially constant for repeated periods, such that as a number of transitions of said at least one interface signal changes in said periods, a number of transitions of said at least one additional signal also changes to make said quantity of transitions of said totality of signals substantially constant, whereby data-dependent variation in the transient-associated energy of the totality of the signals is substantially removed.

12. The circuit of claim 11, wherein said signal generating circuit generates said at least one additional signal such that an equal number of positive and negative transitions are generated among said totality of signals in each period of said at least one interface signal, whereby an energy of transitions in said totality of signals is substantially equal to zero.

13. The circuit of claim 11, wherein said at least one output terminal is a pair of interface terminals, wherein said at least one interface signal is a differential pair of signals provided to said pair of terminals.

14. The circuit of claim 11, wherein said generating generates a differential pair of signals and wherein said providing provides one of said differential pair of signals to said output terminal for communicating a single-ended signal on said electronic interface, and wherein another signal of said differential pair of signals is applied to a load substantially matching said predetermined loading characteristic.

15. The circuit of claim 11, wherein said signal generating circuit generates a pair of additional signals each for delivery to an additional load matching said predetermined loading characteristic, and wherein said pair of additional signals are a differential pair of signals having a transition in each period of said interface signal in which no transition occurs in said interface signal.

16. The circuit of claim 11, further comprising at least one additional output terminal having loading characteristics matching said predetermined loading characteristics, and wherein said at least one additional signal is coupled to a corresponding one of said at least one additional output terminal.

17. The circuit of claim 11, wherein said circuit is packaged within a single semiconductor package further comprising an internal loading circuit having loading characteristics matching said predetermined loading characteristics, and wherein said at least one additional signal is coupled to a corresponding input of said internal loading circuit.

18. The circuit of claim 17, further comprising a measurement circuit for sensing said predetermined loading characteristics of said at least one output terminal.

19. The circuit of claim 18, wherein said internal loading circuit is coupled to said measurement circuit for adjusting said loading characteristics of said internal loading circuit in conformity with a result of said sensing.

20. The circuit of claim 11, wherein said at least one interface signal comprises at least two interface signals, and wherein said generating circuit generates a single additional signal having a number of transitions in each period of said interface signal matching a number of possible transitions in said at least two interface signals in each period of said interface signal less an actual number of transitions in said least two interface signals in each period of said at least two interface signals.

21. A method for ameliorating noise generated from an electronic interface supplying one or more interface signals, comprising generating one or more additional signals in dependence on said one or more interface signals such that among the totality of said additional signals and said interface signals, a quantity of transitions of said totality of signals is substantially constant for repeated periods, such that as a number of transitions of said at least one interface signal changes in said periods, a number of transitions of said at least one additional signal also changes to make said quantity of transitions of said totality of signals substantially constant, whereby data-dependent variation in the transient-associated energy of the totality of the signals is substantially removed.

22. The method of claim 21, wherein an equal number of positive and negative transitions are generated among said totality of signals in each period of said at least one interface signal, whereby an energy of transitions in said totality of signals is substantially equal to zero.

* * * * *